(12) United States Patent
Haschke (10) Patent No.: US 8,808,066 B2
(45) Date of Patent: Aug. 19, 2014

(54) PLASTIC WIRE CLIPPER/STUFFER

(75) Inventor: Eggo Haschke, Deerfield, IL (US)

(73) Assignee: Poly-Clip System Corp., Mundelein, IL (US)

( * ) Notice: Subject to any disclaimer, the term of this patent is extended or adjusted under 35 U.S.C. 154(b) by 158 days.

(21) Appl. No.: 12/204,182

(22) Filed: Sep. 4, 2008

(65) Prior Publication Data

US 2009/0081934 A1 Mar. 26, 2009

Related U.S. Application Data

(60) Provisional application No. 60/974,983, filed on Sep. 25, 2007.

(51) Int. Cl.
| | | |
|---|---|---|
| *A22C 11/00* | (2006.01) | |
| *B65D 33/16* | (2006.01) | |
| *B29C 51/10* | (2006.01) | |
| *B65D 75/46* | (2006.01) | |
| *A22C 11/12* | (2006.01) | |
| *B29C 47/00* | (2006.01) | |
| *B29C 51/08* | (2006.01) | |
| *B29K 23/00* | (2006.01) | |

(52) U.S. Cl.
CPC .............. *B29C 51/10* (2013.01); *B29C 47/0026* (2013.01); *B65D 33/1625* (2013.01); *B29C 47/0054* (2013.01); *B29C 47/0033* (2013.01); *B29C 47/0066* (2013.01); *B29C 47/0021* (2013.01); *B29C 51/082* (2013.01); *B65D 75/46* (2013.01); *B29K 2023/12* (2013.01); *B29C 47/0038* (2013.01); *B29C 47/0035* (2013.01); *A22C 11/125* (2013.01)
USPC .......................................................... 452/48

(58) Field of Classification Search
USPC ............................... 452/30–32, 46, 48, 50–51
See application file for complete search history.

(56) References Cited

U.S. PATENT DOCUMENTS

| | | |
|---|---|---|
| 3,793,688 A | 2/1974 | Keating et al. |
| 3,975,795 A | 8/1976 | Kupcikevicius et al. |

(Continued)

FOREIGN PATENT DOCUMENTS

| | | |
|---|---|---|
| CH | 447109 | 3/1968 |
| DE | 3715626 | * 12/1988 |

OTHER PUBLICATIONS

International Search Report and the Written Opinion of the International Searching Authority, received Mar. 16, 2009 in co-pending PCT application.

(Continued)

*Primary Examiner* — David Parsley
(74) *Attorney, Agent, or Firm* — Timothy M. McCarthy; Clark Hill PLC (57) ABSTRACT

A system for applying plastic clips to tubular products comprises a die comprising a peripheral face, an arcuate wall forming a half-cylindrical bore separating the die peripheral face into a first and a second side, and a groove extending from the first side, through the arcuate wall and the second side, and forming a slot in an outer edge of the die; a punch comprising a peripheral face, an arcuate wall forming a half-cylindrical bore separating the punch peripheral face into a first and a second side, and two grooves extending from the first side to the second side; and a cylinder for moving the die and the punch from a first position in which the die peripheral face and the punch peripheral face are adjacent, to a second position in which the die peripheral face and the punch peripheral face are remote.

15 Claims, 7 Drawing Sheets

(56) References Cited

U.S. PATENT DOCUMENTS

| | | | |
|---|---|---|---|
| 4,044,450 A * | 8/1977 | Raudys et al. | 29/509 |
| 4,571,805 A | 2/1986 | Niedecker | |
| 4,766,713 A * | 8/1988 | Evans | 53/138.2 |
| 4,773,128 A * | 9/1988 | Stanley et al. | 452/31 |
| 5,109,648 A * | 5/1992 | Evans | 53/134.1 |
| 5,167,891 A | 12/1992 | Dijkman, Sr. et al. | |
| 5,324,307 A | 6/1994 | Jarrett et al. | |
| 5,425,667 A * | 6/1995 | Hagedorn et al. | 452/48 |
| 5,497,645 A | 3/1996 | Niedecker | |
| 5,573,454 A * | 11/1996 | Fox et al. | 452/29 |
| 5,755,022 A * | 5/1998 | Whittlesey | 29/788 |
| 5,865,357 A | 2/1999 | Goodwin | |
| 6,205,747 B1 | 3/2001 | Paniagua Olaechea | |
| 6,524,178 B1 * | 2/2003 | Fassler et al. | 452/37 |
| 6,659,020 B1 | 12/2003 | Ball | |
| 6,932,688 B2 * | 8/2005 | Stanley et al. | 452/48 |
| 7,237,369 B2 * | 7/2007 | Griggs et al. | 53/138.2 |
| 7,475,521 B2 * | 1/2009 | Topfer | 53/75 |
| 7,575,506 B2 * | 8/2009 | Ebert et al. | 452/35 |
| 7,654,889 B2 * | 2/2010 | Ebert et al. | 452/48 |
| 7,666,073 B2 * | 2/2010 | Schleucher et al. | 452/48 |
| 2006/0124485 A1 | 6/2006 | Kennedy | |
| 2007/0137142 A1 | 6/2007 | Pinto et al. | |

OTHER PUBLICATIONS

Extended European Search Report, Application No. 08834319.9.

* cited by examiner

PLASTIC WIRE CLIPPER/STUFFER

PRIORITY

This application claims the benefit of U.S. Provisional Patent Application No. 60/974,983, filed Sep. 25, 2007, the disclosure of which is incorporated herein by reference.

This invention relates to the field of packaging material in tubular film, bags, or netting. The invention relates more particularly to packaging food materials, such as pasty food materials, in tubular film, and to packaging food materials, such as poultry, in bags and/or netting.

Food material such as sausage, cookie dough, and polenta is packaged by extruding the pasty material through a product horn and into a tubular film. One preparation system uses film already formed in a tube, such as is described in U.S. Pat. No. 7,063,610, Apparatus And Method To Net Food Products In Shirred Tubular Casing, the disclosure of which is incorporated herein by reference. Another preparation system uses flat sheets of film, which is turned over plows and guides and formed into a tube as the pasty food product is extruded, such as is described in U.S. Pat. No. 4,958,477, Apparatus for the Production of Meat Products, the disclosure of which is incorporated herein by reference. In either system, the chubs or sausages formed in the process are closed at each end by a clip.

Food material such as poultry, whether whole birds or parts, is packaged by placement into bags, such as is described in U.S. Pat. No. 6,895,726, Poly-stretch Bagger System, the disclosure of which is incorporated herein by reference. The bag in this situation is closed with a clip.

Other types of food materials, such as hams, are enclosed in netting, either with or without a film, such as is described in U.S. Pat. No. 6,883,297, Apparatus for Enclosing Material in a Net, the disclosure of which is incorporated herein by reference. The net, and film, if it is used, are closed with a clip in this situation.

Conventional clips for each of these processes are made of metal, typically aluminum. The clips are typically formed from wire by a clip manufacturer and are supplied to the food manufacturer in sticks or in reels. In other processes, wire from a reel is wrapped around the neck of the tubular film and severed, to seal the tubular film.

Food manufacturers desire to keep metal out of their products. Accordingly, one manufacturing practice for making food, particularly pasty food products such as sausage, cookie dough, or polenta, is to run the pasty food product through a metal detector. Since the clips used to enclose the food products are made of metal, the metal detecting step must come before the stuffing step. Accordingly, a conventional food-making operation will have first a food mixer in which the sausage meat, cookie dough, or polenta is prepared. The pasty food mixture is then pumped via a plastic or glass pipe to a metal detector, which scans for the presence or metal. The pasty food mixture, if free of metal, then continues to a clipper/stuffer, where the mixture is formed into chubs or sausages by, for example, one of the processes described in the patents listed previously.

Some food manufacturers prefer to scan the completed food products for metal, rather than scanning the raw pasty mixture. This practice does not permit the use of metal clips. Plastic clips must be used in this situation. Plastic clips are typically formed into reels or sticks by injection molding. The reels or sticks are then used in the machines described in the patents listed previously.

Similarly, in some situations food manufacturers wish to irradiate food products, to destroy microorganisms, bacteria, viruses, or insects. In these situations, the use of metal clips is contraindicated. In yet other situations, it is desirable that the food products not be scaled by metal clips.

A need exists for enclosing food products, including but not limited to sausages or chubs, with plastic clips in an easy and inexpensive manner. The present invention meets this need.

BRIEF SUMMARY OF THE INVENTION

The present invention comprises a system for forming sausages or chubs by closing plastic clips around a neck of gathered tubular film to enclose material within the tubular film. In one embodiment, the system comprises a die and a punch. The die has a peripheral face, an arcuate wall in the die peripheral face forming a half-cylindrical bore, the bore separating the die peripheral face into a first side and a second side, and a groove formed in the arcuate wall and the second side, the groove extending from the first side, through the arcuate wall and the second side, and forming a slot in an outer edge of the die. The punch has a peripheral face, an arcuate wall in the punch peripheral face forming a half-cylindrical bore, the bore separating the punch peripheral face into a first side and a second side, and a pair of grooves, the grooves extending from the first side to the second side of the punch peripheral face. The system also has a means for moving at least one of the die and the punch from a first position in which the die peripheral face and the punch peripheral face are adjacent, to a second position in which the die peripheral face and the punch peripheral face are remote. In some embodiments, a knife system is supplied adjacent the die.

BRIEF DESCRIPTION OF THE SEVERAL VIEWS OF THE DRAWINGS

The organization and manner of the structure and operation of the invention, together with further objects and advantages thereof, may best be understood by reference to the following description, taken in connection with the accompanying non-scale drawings, wherein like reference numerals identify like elements in which.

DETAILED DESCRIPTION OF THE PREFERRED EMBODIMENTS OF THE INVENTION

While the invention may be susceptible to embodiment in different forms, there is shown in the drawings, and herein will be described in detail, specific embodiments with the understanding that the present disclosure is to be considered all exemplification of the principles of the invention, and is not intended to limit the invention to that as illustrated and described herein. The embodiments described herein apply to forming a sausage or chub from a pasty filling in a clipper/stuffer, but the invention can also be used to enclose other material, such as cookie dough or polenta, in tubular casing, to enclose sausages in netting, to enclose materials such as whole-muscle meats or hard sausages in film and/or netting, to enclose other material, including non-food material, in film, netting, or bags, and in any other situation in which a plastic clip is preferred.

The preferred embodiment of the present invention uses package enclosures to close tubular film or netting. Package enclosures as described herein comprise a series 20 of connected plastic clips 22. A series 20 of clips 22 is supplied to a customer on a stick, a spool, or a reel. Clips 22 can be formed in a particular color and can have designating information imprinted thereon. Clips 22 are preferably extruded from a thermoplastic such as polyethylene or polypropylene. In other embodiments, another material not opaque to x-rays or sterilizing radiation is used. In yet other embodiments, clips 22 are injection molded.

Figure 1:
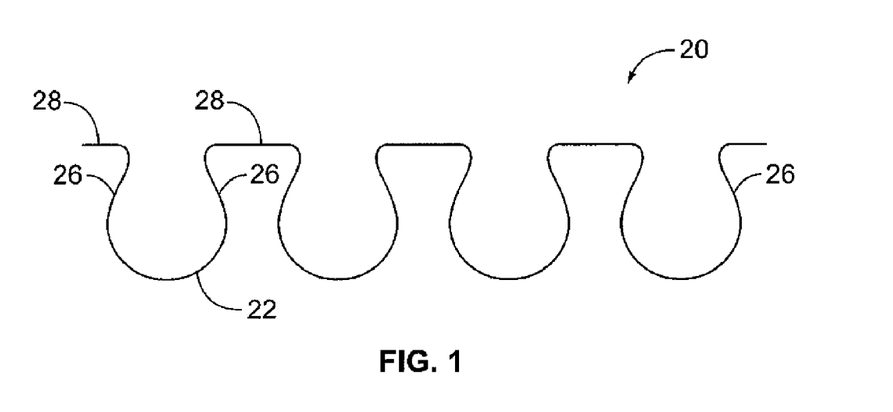
FIG. 1 is an elevation view of a series of clips as used in the preferred embodiment of the invention.

The preferred embodiment of clips 22 is shown in side elevation view in FIG. 1. Each clips 22 has an arched shape with a curved or semicircular first section 24, two bending sections 26 extending from first section 24, and a connecting section 28 extending from each bending section 26. Each connecting section 28 connects to a connecting section 28 of an adjacent clip 22 (except the first and last clip 22 of a series 20).

Figure 2:
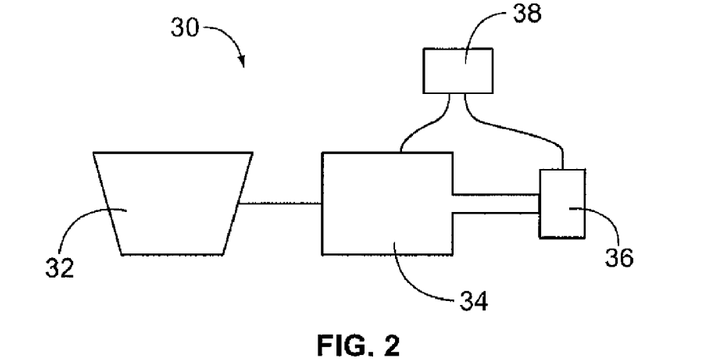
FIG. 2 is a diagrammatic view of the sausage-making system of the present invention.

Series 20 of clips 22 are used in the illustrated embodiment in a sausage-making system 30, as shown diagrammatically in FIG. 2. System 30 comprises a mixing chamber 32, a stuffer 34, a die system 36, and a controller 38.

Mixing chamber 32 is preferably a conventional mixer used to make a pasty filling for sausages. Mixing chamber 32 delivers the pasty filling to stuffer 34, an apparatus capable of encasing material, such as pasty products, into fibrous, collagen, or plastic casing. Stuffer 34 is preferably a Poly-clip System Corp ICA 8700 automatic double clipper. In other embodiments, stuffer 34 also comprises a netter. In yet other embodiments, mixing chamber 32 is replaced by a delivery system for other material as described above, to be encased in film or netting in stuffer 34.

In the illustrated embodiment, stuffer 34 encases the pasty filling into casing in a conventional manner. The casing can be a preformed tubular film or can be formed into tubes from flat sheets of roll stock film. Die system 36 encloses the pasty filling in the casing by applying a clip 22 at each end of a sausage or between each of a series of chubs to form the finished product.

Controller 38 is coupled to and controls the operations of mixing chamber 32, stuffer 34, and die system 36. Controller 38 is preferably a programmed logic controller, analog controller, computer, or microprocessor. In one embodiment, controller 38 is a Siemens central processing unit, with a "power 5 6EP1333-1SL11" power supply, a "Simatic S7-300 314-1AEO4-0AB0" PLC, a 32-output "SM322 321-1BL00-0AA0" card, a 32-input "SM 321 321-ABL00-0AA0" card, and a 16-input "SM 321 321-1BH0S-0AA0" card.

In another embodiment, controller 38 is a PLC controller having an indexer, preferably a Commander SK AC drive with LogicStick, such as one sold by Control Techniques division of Emerson Electric Co. The LogicStick provides PLC functionality and is preferably programmed using a PC/laptop computer with SyPTLite software and a CT Comms Cable connecting lead.

In yet another embodiment, controller 38 is a command controller. In yet another embodiment, system 30 is operated manually.

Figure 3:
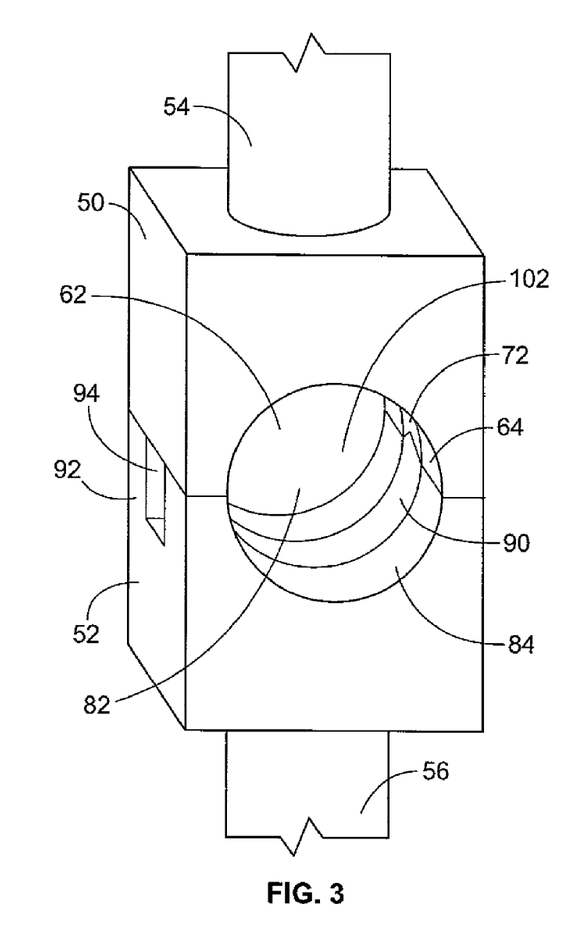
FIG. 3 is a perspective view of the die system of the preferred embodiment of the present invention, with the die and punch in a first, adjacent position.
Figure 4A:
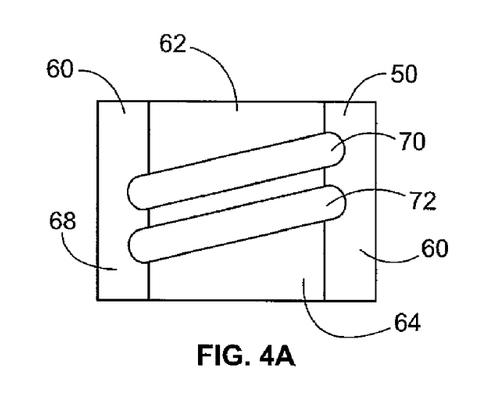
FIG. 4A is a plan view of the punch of the die system of FIG. 3.
Figure 4B:
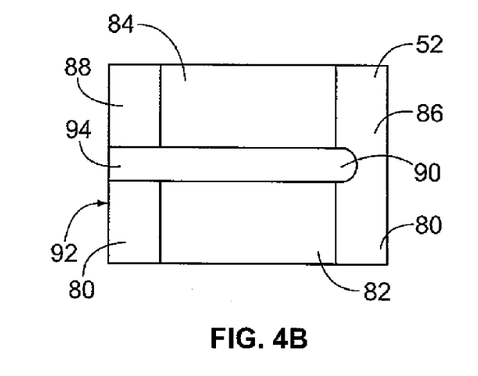
FIG. 4B is a plan view of the die of the die system of FIG. 3.
Figure 5:
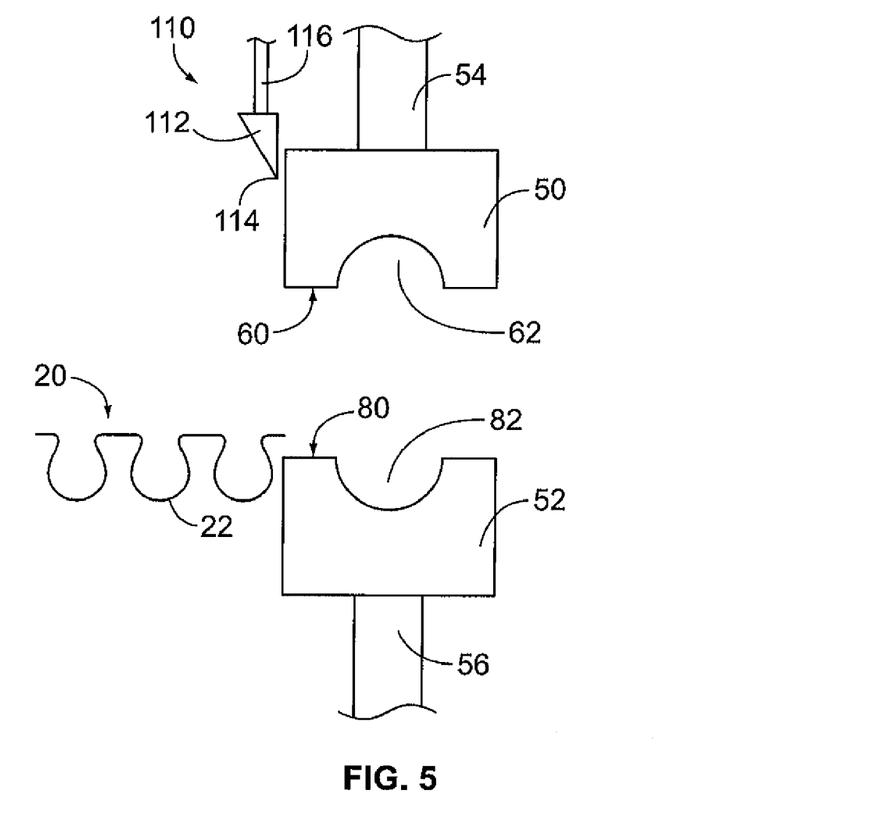
FIG. 5 is an elevation view of the die system and the knife system of an embodiment of the present invention, with the die and punch in a second, remote position.

Die system 36 has a punch 50 and die 52, as shown in, for example, FIGS. 3, 4A, and 4B. Punch 50 moves in a reciprocating manner from a first position, adjacent to die 52, as shown in, for example, FIG. 3, to a second position, remote from die 52, as shown in FIG. 5. Preferably, in the first position, punch 50 is flush or nearly flush with die 52.

Punch 50 preferably is moved between positions by an air-actuated cylinder 54. Cylinder 54 preferably runs off plant air and is controlled by controller 38. In other embodiments, punch 50 is situated at the end of a lever arm which swings, manually or by actuation of cylinder 54, to move punch 50 between positions. In yet another embodiment, punch 50 is moved between positions manually.

Similarly, die 52 moves in a reciprocating manner from a first position, adjacent to punch 50, as shown in, for example, FIG. 3, to a second position, remote from punch 50, as shown in FIG. 5. Preferably, in the first position, die 52 is flush or nearly flush with punch 50. Die 52 preferably is moved between positions by an air-actuated cylinder 56. Cylinder 56 also preferably runs off plant air and is controlled by controller 38. In other embodiments, die 52 is situated at the end of a lever arm which swings, manually or by actuation of cylinder 56, to move die 52 between positions. In yet another embodiment, die 52 is moved between positions manually.

In the preferred embodiment, both punch 50 and die 52 move relative to stuffer 34. In another embodiment, die 52 is stationary with respect to stuffer 34 and only punch 50 moves between a first position and a second position.

Punch 50 is a solid block, as shown in FIG. 3. Punch 50 has peripheral face 60 on a side opposite the connection of cylinder 54 to top die 50, as shown in FIG. 4A. A half-cylindrical bore 62 forms an arcuate wall 64, separating a first side 66 of peripheral face 60 from a second side 68 of peripheral face 60. A pair of parallel grooves 70, 72 is formed in arcuate wall 64, extending from first side 66 to second side 68.

Die 52 has a peripheral face 80 on a side facing peripheral face 60 of punch 50, as shown in FIG. 4B. A half-cylindrical bore 82 forms an arcuate wall 84 in peripheral face 80, separating a first side 86 of peripheral face 80 from a second side 88 of peripheral face 80. A single groove 90 is formed in die 52. Groove 90 extends from first side 86, through arcuate wall 84, through second side 88, and through out outer edge 92 of die 52, thereby forming slot 94 in die 52.

When die 52 is in its remote position, as shown in FIG. 5, slot 94 is open on outer edge 92 and peripheral face 80. Series 20 of clips 22 are fed to die 52. A single clip 22 moves through slot 94 and sets in groove 90, as shown in sideways cross-section in FIG. 6. The remaining clips 22 of series 20 remain outside die 52.

Figure 7:
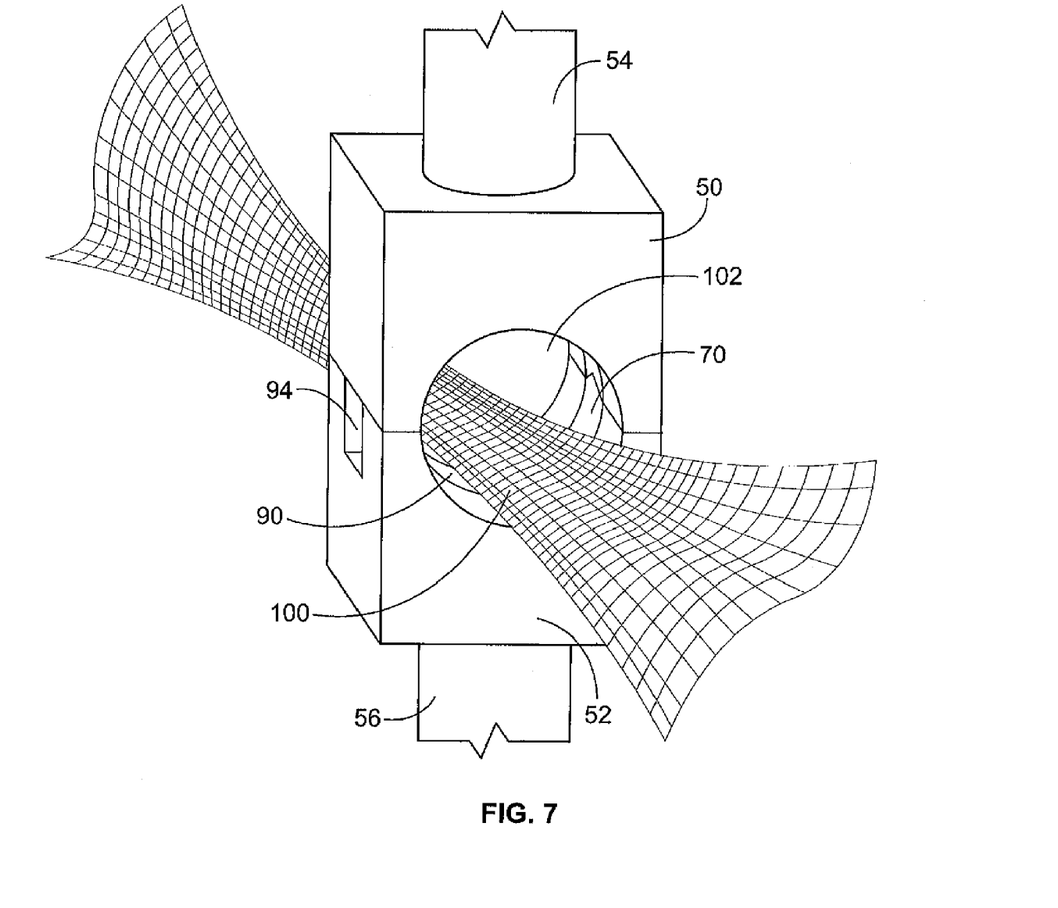
FIG. 7 is a perspective view of the die system of FIG. 3 enclosing a neck of gathered casing and netting captured by the die system of the preferred embodiment of the invention.

Voider gates or irises on stuffer 34 form a neck 100 of gathered casing over bore 82. Controller 38 causes die 52 to ascend to its second position, thereby capturing neck 100 within clip 22. Controller 38 then causes punch 50 to descend to its second position, in which peripheral face 60 is flush or nearly flush to peripheral face 80, thereby enclosing neck 100 within the passageway 102 formed by bore 62 and bore 82. FIG. 7 shows a neck of gathered netting and casing enclosed within passageway 102, with clip 22 not shown for clarity.

Figure 8A:
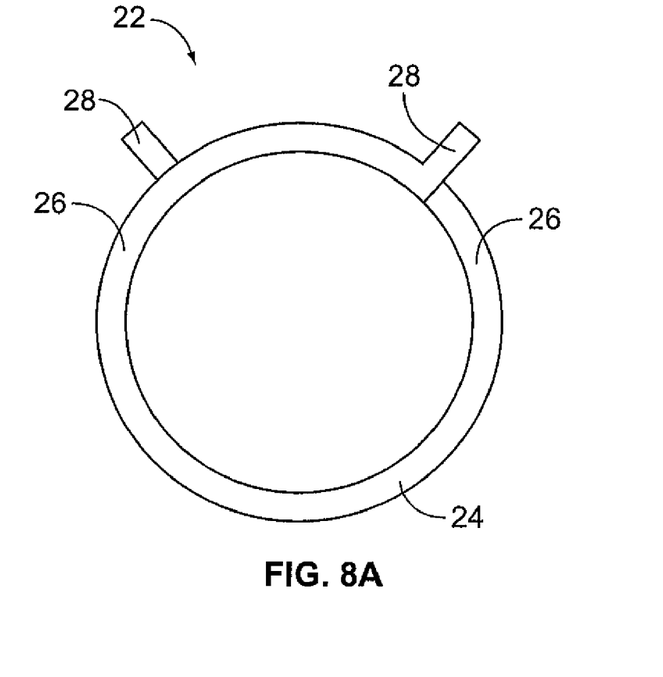
FIG. 8A is a side elevation view of a clip as closed by the apparatus of FIG. 2.
Figure 8B:
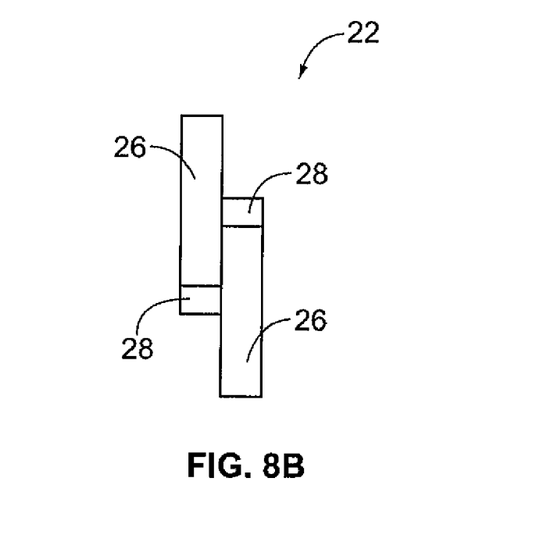
FIG. 8B is a top plan view of the clip of FIG. 8A.

As punch 50 descends, groove 70 captures one connecting section 28 of clip 22 and groove 72 captures the other connecting section 28 of clip 22, forcing both connecting sections 28 to bend inward toward, thereby causing bending sections 26 also to bend inward, thereby Forming open clip 22 into the closed position, shown in side elevation view in FIG. 8A and in top plan view in FIG. 8B.

In the preferred embodiment, the punching action of punch 50 will break connecting section 28 from the connecting section 28 of the next clip 22 in series 20. In another embodiment, a knife system 110 is mounted to die system 36, as shown in FIG. 5. Knife system 110 has a knife 112 having a knife edge 114. Knife 112 moves in a reciprocating manner from a first position, remote from slot 94, to a second position adjacent slot 94. Knife 120 preferably is actuated to move between positions by an air-actuated cylinder 116, controlled by controller 38. In other embodiments, knife 112 is situated at the end of a lever arm which swings, manually or by actuation of cylinder 116, to move knife 112 between positions. When knife 112 moves from the first position to the second position, knife edge 114 eclipses the opening to slot 94 and severs connecting section 28 of the clip 22 held within groove 90, from connecting section 28 of the next clip 22 in the series 20.

In a first embodiment of sausage-making system 30, there is a single die system 36. Repeated periodical application of clips 22 to gathered necks 100 of casing thereby forms a line of chubs. In another embodiment, there is a pair of die systems 36 mounted adjacent stuffer 34. When the voider gates or irises of stuffer 34 form a neck 100 of gathered casing, each die system 36 applies a separate clip 22 to neck 100 and a separate knife from stuffer 34 severs neck 100 between the two clips 22, one of which forms the back end of a sausage and one of which forms the front end of the next sausage to be made.

Figure 6:
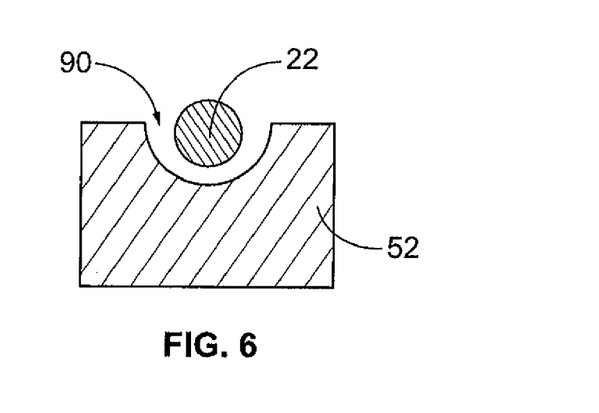
FIG. 6 is a cross-sectional view of a clip inside the groove of the die system of FIG. 3.

Clips 22 are preferably formed of a thermoplastic polymer, most preferably polypropylene, by an extrusion process. In another embodiment, clips 22 are molded. Clips 22 are preferably circular in cross section, as shown in FIG. 6. In other embodiments, clips 22 have other cross-sectional shapes.

Figure 9A:
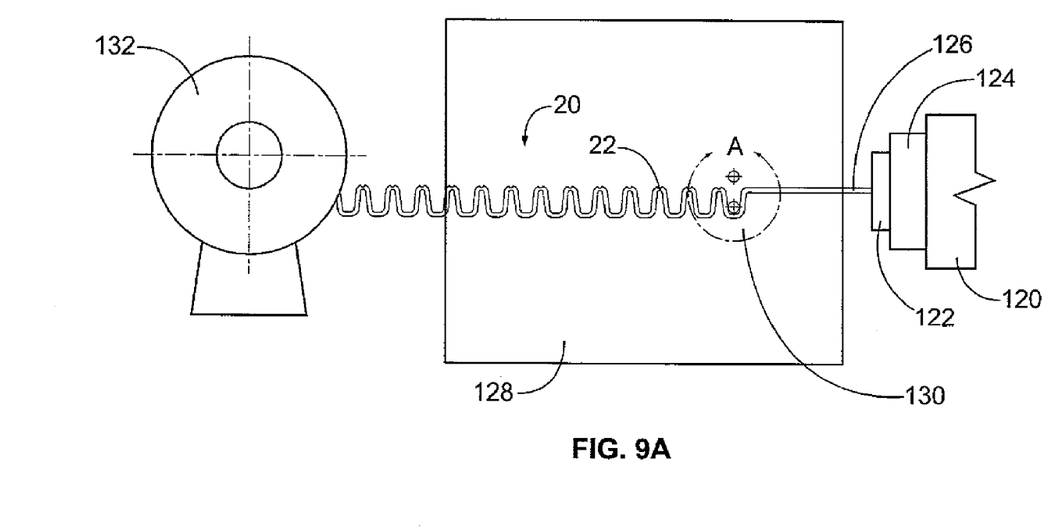
FIG. 9A is an embodiment of an apparatus for making extruded clips for use in the apparatus of FIG. 2.
Figure 9B:
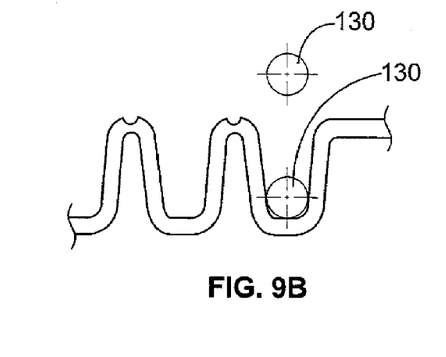
FIG. 9B is a closer view of the forming tool of the apparatus of FIG. 9A.

An apparatus for forming clips 22 by an extrusion process is shown in FIGS. 9A and 9B. A thermoplastic resin is melted and extruded from extruder 120, a conventional extruder having, for example, a feed hopper, a screw drive or other drive system, a heater, and a die 122 located on the head 124 of extruder 120. The thermoplastic resin is melted and formed into a thin extrudate 126. Extrudate 126 preferably has a circular cross-section as it exits die 122. In other embodiments, extrudate 126 has a rectangular cross-section or a polygonal cross-section, such as hexagonal. Other cross-sectional shapes are possible, depending on the final application.

Extrudate 126 enters a vacuum calibration station 128. Extrudate 126 is vacuum thermoformed in station 128 into individual clips 22, forming a series 20 of clips 22, such as the series 20 shown in FIG. 1. In one embodiment, extrudate 126 is pulled over a female mold and a vacuum is pulled between extrudate 126 and the mold. In another embodiment, forming tool 130 is used to form clips 22, as shown in FIG. 9B. Forming tool 130, configured to actuate perpendicular to extrudate 126, has the shape of the inside of clip 22. Forming tool 130 is configured to form extrudate 126 into whatever shape is desired for the final application of clip 22.

Forming tool 130 descends to form extrudate 126 in the shape of clip 22, then retracts as extrudate 126 advances, then descends again to form the next clip 22 in the series 20. In either embodiment, series 20 continues through station 128, where it is cooled, and continues out of station 12 where it is gathered onto a reel 132.

Figure 10A:
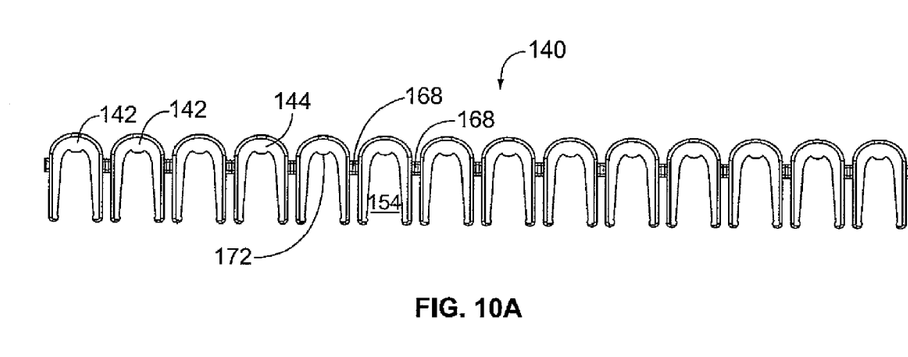
FIG. 10A is a side view of a stick of molded clips for use in the apparatus of FIG. 2.
Figure 10B:
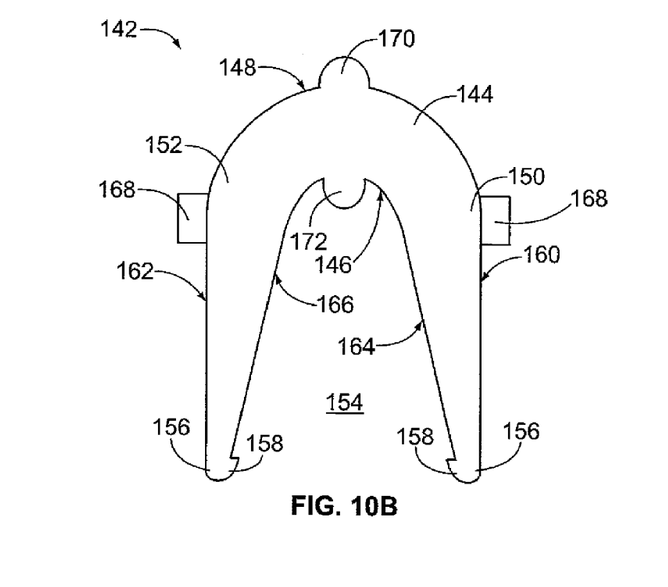
FIG. 10B is a side view of an individual clip of the stick of FIG. 10A.

An embodiment of molded clips shown in FIG. 10A. In this embodiment, a stick 140, as shown in FIG. 10A, of individual clips 142, as shown in FIG. 10B, is molded preferably from a thermoplastic polymer, most preferably polypropylene. Each clip 142 has a top section 144 with an internal face 146 and an external face 148. As illustrated, top section 144 is generally rounded, but it can be straight and can have sharp corners if desired. Two legs 150, 152 extend from opposite ends of top section 144. Accordingly, legs 150, 152 and top section 144 define a space 154 within clip 142.

Each leg 150, 152 terminates, at an end opposite top section 144, in a foot section 156. Each foot section 156 has a protrusion 158 extending into space 154. Legs 150, 152 preferably are narrower in front cross-section, at an end having protrusion 158, than at an end meeting top section 144. Preferably, outer edge 160 of leg 150 is parallel to outer edge 162 of leg 152, so that the narrowing of each leg 150, 152 occurs from sloping of inner edge 164 of leg 150 and inner edge 166 of leg 152, relative to outer edges 160, 162, respectively.

Each clip 142 is preferably approximately 200 millimeters deep. Each outer edge 160, 162 has a connecting portion 168 projecting outwardly. Each connecting portion 168 is joined a connecting portion 168 of an adjacent clip 142 (except on the first and last clip 142 in a stick 140) to form stick 140. In use, each connecting portion 168 will easily snap from adjacent connecting portion 168, allowing an individual clip 142 to be removed from stick 140.

In another embodiment, connecting portion 168 projects from a different portion of clip 142, such as from top section 144.

Clip 142 can have a projecting shoulder 170, to enhance alignment, as shown in FIG. 10B. Clip 142 can also have a pin 172 projecting into space 154, as shown in FIG. 10B, to enhance the grip on clip 142 on the neck 100 of packaging.

While preferred embodiments of the present invention are shown and described, it is envisioned that those skilled in the art may devise various modifications of the present invention without departing from the spirit and scope of the appended claims.

I claim:

1. A system for packaging material in tubes by applying plastic clips, each clip comprising a semicircular first section having an internal face and an external face, two bending sections projecting from opposite ends of the first section, each said bending section having a first end proximal to the first section and a second end distal to the first section, said first section and said bending sections defining a space, and at least one connection section connecting said second end of at least one of said bending sections to said second send of at least one bending section of at least one adjacent clip, the system comprising:

a die and a punch, said die comprising a peripheral face, an arcuate wall in said die peripheral face forming a half-cylindrical bore, said bore separating said die peripheral face into a first side and a second side, and a die groove formed in said arcuate wall and said second side, said die groove extending from said first side, through said arcuate wall and said second side, and forming a slot in an outer edge of said die, said punch comprising a peripheral face, an arcuate wall in said punch peripheral face forming a half-cylindrical bore, said bore separating said punch peripheral face into a first side and a second side, and a pair of grooves, said grooves extending from said first side to said second side of said punch peripheral face; and means for moving said punch from a first position in which said die peripheral face and said punch peripheral face are adjacent, to a second position in which said die peripheral face and said punch peripheral face are remote, said first section and said bending sections configured to sit solely in said die groove and not in said slot when said punch is in said first position, said slot receiving only said connection section when said punch is in said first position.

2. The system of claim 1, wherein said means for moving comprises an air cylinder connected to said punch.

3. The system of claim 1, further comprising a knife system mounted adjacent said outer edge of said die, said knife system comprising a knife having a knife edge, said knife moveable from a first position remote from said slot, to a second position adjacent said slot.

4. A system for forming products in casing, comprising a mixer, a stuffer, and the die system of claim 1.

5. The system of claim 4, further comprising a netter.

6. The system of claim 4, further comprising a second die system of claim 1.

7. A system for forming products in casing, comprising a mixer, a stuffer, and the die system of claim 3.

8. The system of claim 7, further comprising a netter.

9. The system of claim 7, further comprising a second die system of claim 1.

10. The system of claim 1, wherein said clips comprise a thermoplastic polymer.

11. The system of claim 1, each said clip further comprising a shoulder projecting from said external face.

12. The system of claim 1, each said clip further comprising a pin projecting into said space.

13. The system of claim 4, wherein said clips comprise a thermoplastic polymer.

14. The system of claim 4, each said clip further comprising a shoulder projecting from said external face.

15. The system of claim 4, each said clip further comprising a pin projecting into said space.

* * * * *